US006653622B2

(12) United States Patent
Franzen

(10) Patent No.: US 6,653,622 B2
(45) Date of Patent: Nov. 25, 2003

(54) ION FRAGMENTATION BY ELECTRON CAPTURE IN HIGH-FREQUENCY ION TRAPS

(75) Inventor: Jochen Franzen, Bremen (DE)

(73) Assignee: Bruker Daltonik GmbH, Bremen (DE)

(*) Notice: Subject to any disclaimer, the term of this patent is extended or adjusted under 35 U.S.C. 154(b) by 0 days.

(21) Appl. No.: 09/989,306

(22) Filed: Nov. 20, 2001

(65) Prior Publication Data

US 2002/0175280 A1 Nov. 28, 2002

(30) Foreign Application Priority Data

Nov. 25, 2000 (DE) ........................................ 100 58 706

(51) Int. Cl.[7] .......................... B01D 59/44; H01J 49/00
(52) U.S. Cl. ....................... 250/282; 250/281; 250/283
(58) Field of Search ................................ 250/291, 281, 250/282, 283

(56) References Cited

U.S. PATENT DOCUMENTS

| | | | | |
|---|---|---|---|---|
| 5,298,746 A | * | 3/1994 | Franzen et al. | 250/292 |
| 2002/0005479 A1 | * | 1/2002 | Yoshinari et al. | 250/288 |

FOREIGN PATENT DOCUMENTS

| | | |
|---|---|---|
| EP | 0 270 232 A1 | 10/1987 |
| GB | 1 225 272 | 3/1968 |

OTHER PUBLICATIONS

G. Brincourt, et al., Rydberg Electron Capture Mass Spectrometry of Some Environmental Pollutants, International Journal of Mass Spectrometry 189 (1999) pp. 181–188, France.

* cited by examiner

*Primary Examiner*—John R. Lee
*Assistant Examiner*—Erin-Michael Gill

(57) ABSTRACT

The invention relates to procedures and devices for fragmenting large molecules, preferably biomolecules, in high-frequency quadrupole ion trap mass spectrometers. The invention consists of fragmenting the ions by electron capture, achieved by injecting electrons as a beam through an aperture in the ion trap electrode carrying the RF voltage, whereby the electron source is kept at the highest positive potential achieved at the center of the ion trap during the RF cycle. The electrons can reach the ions stored here only during a period of a few nanoseconds; during this period their energy is very low. At every other time the trap potential prevents the penetration of electrons into the ion cloud, since their local potential is always more negative than that of the electron source, so that the negatively charged electrons are repelled.

14 Claims, 2 Drawing Sheets

ION FRAGMENTATION BY ELECTRON CAPTURE IN HIGH-FREQUENCY ION TRAPS

BACKGROUND OF THE INVENTION

1. Field of the Invention

The invention relates to procedures and devices for fragmenting molecular ions, preferably biomolecular ions, in high-frequency quadrupole ion trap mass spectrometers.

2. Description of the Related Art

Paul ion traps consist of a ring electrode and two end cap electrodes, whereby a storage RF voltage is usually fed to the ring electrode; however, other modes of operation can also be implemented. Ions can be stored in the interior of the ion trap within the quadrupolar RF field. The ion traps can be used as mass spectrometers in which the stored ions are ejected mass specifically and measured by a secondary electron multiplier. Several different methods are known for ion ejection which will not be discussed any further here.

The RF voltage at the ring electrode is very high, and in customary ion trap mass spectrometers it can be ramped up, during a mass scan, to maximum voltages between 15 and 30 kV (peak to peak). The frequency is in the range of 1 MHz. In the interior a mainly quadrupolar field is generated which oscillates with the RF voltage and drives the ions above a certain mass threshold back into the center, which results in so-called secondary oscillations of the ions in the trap. The retroactive force in the ion trap is sometimes described as a so-called pseudopotential, which is determined by the average of the forces of the real potential over time. At the center there is a saddle point for the oscillating real potential which quadratically falls off from the saddle point to the ring electrode, and quadratically increases from the saddle point to the end cap electrode (or vice versa, depending on the phase of the RF voltage).

Ion trap mass spectrometers possess properties which make their use interesting for many types of analysis. For example, selected ion types (so called "parent ions") can be isolated and fragmented in the ion trap. The spectra arising from such fragment ions are termed "fragment ion spectra" or "daughter ion spectra" of the corresponding parent ions. "Granddaughter spectra" as fragment ion spectra of selected daughter ions can also be measured. Until now, ions have usually been fragmented by a large number of collisions with a collision gas; the oscillation of the ions to be fragmented is excited by a bipolar alternating field in such a way that the ions can accumulate energy from the collisions, a situation which eventually leads to disintegration of the ions.

Although the ions can be produced in the interior, they can also be introduced from the outside. A collision gas in the ion trap ensures that the originally existing ion oscillations are decelerated and damped in the quadrupolar RF field; the ions then accumulate as a small cloud in the center of the ion trap. The diameter of the cloud in customary ion traps is usually about a millimeter; this is determined by an equilibrium between the centering effect of the RF field (the retroactive force of the pseudopotential) and the Coulomb forces of repulsion between the ions. The internal dimensions of commercial ion traps are usually characterized by a spacing between the end caps of about 14 mm, while the ring diameter is between 14 and 20 mm.

A common method for ionizing larger biomolecules is the electrospray procedure (ESI=electrospray ionization) whereby ions are ionized at atmospheric pressure outside the mass spectrometer. These ions are then introduced via well known admission systems into the vacuum of the mass spectrometer and from there into the ion trap.

Such ionization produces virtually no fragment ions; the ions are primarily those of the sprayed molecules. With electrospraying, however, multiply charged molecular ions are produced in large numbers. Due to the almost complete absence of fragment ions during the ionization process, the only information which can be acquired from the mass spectrum is the molecular weight of the molecule; no information is acquired regarding internal molecular structures, which might otherwise be used for further identifying the substance present. Such information can only be acquired when fragment ion spectra are recorded.

Recently, a procedure for fragmenting biomolecules, mainly peptides and proteins, has become known from Ion Cyclotron Resonance (ICR) or Fourier Transform Mass Spectrometry (FTMS). This involves allowing ions to capture low energy electrons, whereby the released ionization energy leads to the fracturing of usually chained molecules. The procedure has been termed ECD (electron capture dissociation). If the molecules are double charged, one of the two fragments stays in place as an ion. The fragmentation follows very simple rules (for experts: there are essentially only c breaks, and only very few y breaks of the amino acids of a peptide), so that the composition of the molecule can be deduced very easily from the fragmentation pattern. The sequence of peptides and proteins in particular can be easily seen from the fragmentation pattern. The interpretation of these ECD fragment spectra is less complicated than the interpretation of collisionally generated fragment spectra.

Although it is also possible to fragment singly or triply charged ions in this way, this procedure displays its best performance with doubly charged molecules. If an electrospray ionization is applied to peptides, the most frequently produced ions are usually doubly charged. Electrospray ionization is a method of ionization which is applied particularly often to biomolecules for mass spectroscopic studies in ion traps.

For fragmentation by electron capture, the kinetic energy of the electrons must be very low since no capture can occur otherwise. In practice, electrons are provided with an energy which is only marginally greater than the thermal energy of the electrons. This can be done extremely well in the very strong magnetic field of the Fourier transform mass spectrometer, since the electrons simply drift along the magnetic field lines until they reach the ion cloud.

However, in Paul electric RF ion traps this can not occur. As a rule, ion traps possess perforations in the end cap through which the ions can enter and leave. When ionization occurs internally the ionizing radiation is also introduced through this end cap perforation. For this purpose one usually uses an electron beam. The strongly oscillating RF field in the interior of the ion trap either accelerates the electrons so that they rush through the trap volume with considerable energy, or it repels the electrons already at the admission hole. Such electrons are hardly suited for electron capture. Only for an extremely short period of time, for fractions of nanoseconds during the periods when the RF voltage traverses zero, is there no field and can low energy electrons reach the ion cloud in a low energy form. However, this small number of low energy electrons coexists with many more electrons which have been accelerated to substantial energies; fragmentation by high-energy electron collision completely blankets fragmentation by electron capture and in this way renders the fragment ion spectra unusable.

SUMMARY OF THE INVENTION

In its simplest implementation, the procedure of the invention injects electrons into the ion trap not through one of the end cap perforations, but instead through an additionally made aperture in the ring electrode, while the electron source is kept at such a high positive potential that the oscillating potential at the center of the ion trap is only just achieved or exceeded (i.e. at the RF voltage maximum) for a very short period of a few nanoseconds. Only during this period can the electrons reach the ion cloud, decelerated to near zero kinetic energy, and thereby ideal for ion capture. At all other time-points the electrons are not capable of reaching the center of the ion trap since the potential of the center is more negative than that of the electron source so that it repels the always negatively charged electrons.

Deceleration of the electrons occurs on the way from the ring electrode to the center; the electrons must scale the saddle-like potential peak (see FIGS. 1 and 2). The ion cloud is located at the saddle point. In the z direction, i. e. the direction through both end caps, the saddle potential focuses the electrons on the ion cloud, and laterally deviating electrons are driven back to the correct course in the saddle well. In the r direction across the ring electrode, however, there acts a defocusing field, and only ions with the correct original direction can reach the ion cloud.

The low energy electrons are easily captured, in a first step, by the ion cloud (not yet by individual ions). Within the ion cloud, there exists a potential well capable to hold back the electrons. The capturing process is initiated by deflecting electrons in near hits with positive ions, thereby straying and capturing the electrons in the potential well. The electrons can be kept captured in the potential well even during the next cycles of the trap RF. This keeps the electrons ready for the next capturing step: capture of the electrons by the individual ions, leading to dissociation.

Fragmentation in the ion trap usually is performed at an RF voltage which is between a tenth and a fifth of the maximal voltage required for spectral recording. An RF voltage of e.g. around 3 kV (peak-to-peak) is set for fragmentation, and this voltage fluctuates sinusoidally in a range from −1.5 to +1.5 kV (chassis or ground potential) at the ring. The end cap electrodes are held at ground potential. The center of the ion trap follows the ring potential so that it is always about half the ring electrode potential when the internal radius of the ring electrode is 1.4× greater than the distance between the end cap electrodes, i.e. between −750 and +750 V. If the electron source is kept at a DC potential of +750 V, the electrons can reach the center only when the ring potential has a maximum potential of +1.5 kV so that the center has a potential +750 V. The electrons in this case are accelerated outside the ion trap from the potential of the electron source (+750 V) to the potential of the ring electrode (+1.5 kV) so that they gain an energy of 750 electron-volts. In the interior of the ion trap the kinetic energy of 750 eV is decelerated practically to 0 eV since a potential of +750 V prevails at the center. At all other time-points the center possesses a negative potential which repels the negatively charged electrons.

For an ion trap in which the distance between the end caps and the radius of the ring electrodes are more or less equal, the potential at the center is about ⅔ that of the ring electrode.

The conditions for allowing access of low energy electrons prevail only for a short period when the maximum RF voltage is present in the saddle. The duration is only approximately 1% of the oscillation cycle, i.e. approx. 10 nanoseconds. With an electron source, electron currents of approx. 100 $\mu$A can be very easily achieved, i.e. $6\times10^6$ electrons in 10 nanoseconds. For a satisfactory spectrum only approximately $10^3$ ions should be present in the ion cloud, since otherwise a deterioration of mass resolution occurs due to the effects of space charging. Even if a ten-fold greater number of ions is stored in order to compensate for losses in fragmentation yield, the number of electrons in a single high frequency period is still many times greater than the number of ions present. Since the supply of electrons can be maintained for a thousand or more high frequency cycles, a sufficiently large supply of electrons can easily be provided, even taking into account the defocusing effect in r direction.

The procedure can also be implemented involving injection of electrons through an aperture in one of the end caps. In this case, however, the end caps should be supplied with RF voltage so that they are both in-phase (commercial ion traps usually do not offer this option), and the ring electrode should be held at the chassis potential. The invention also embraces an ion trap mass spectrometer for implementing the procedure, with at least one aperture in the ring electrode and with an electron source whose electron generation potential can be adjusted to the required voltage.

DETAILED DESCRIPTION

Figure 1:
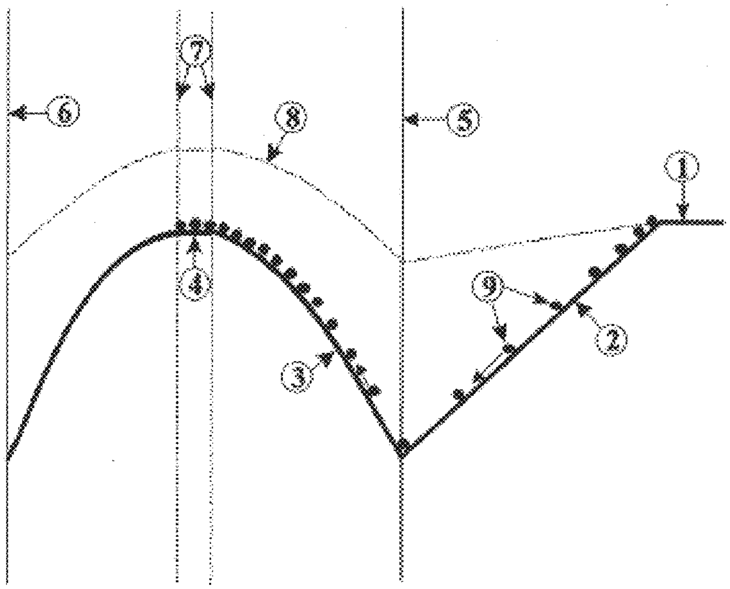
FIG. 1 graphically depicts the potential profile 1, 2, 3, 4 from the position of the electron source 1 to that of the ion cloud 4 at the time when the maximal potential of the RF cycle is achieved. The positions 5 and 6 depict the ring electrode, and in the space 7 the ion cloud has established itself. The electrons 9 first roll down the potential slope 2 between the electron source potential 1 and the potential of the ring electrode 5, and are then decelerated on the rising potential slope 3 until the potential of the ion cloud 4 is reached. This potential profile prevails only for the few nanoseconds of the RF cycle when the maximum potential is reached. The trace 8 shows the potential profile during another phase of the RF cycle. Positive potentials are directed downward, and negative potentials are directed upward so that the "rolling" of the electrons 9 can be depicted more clearly.
Figure 2:
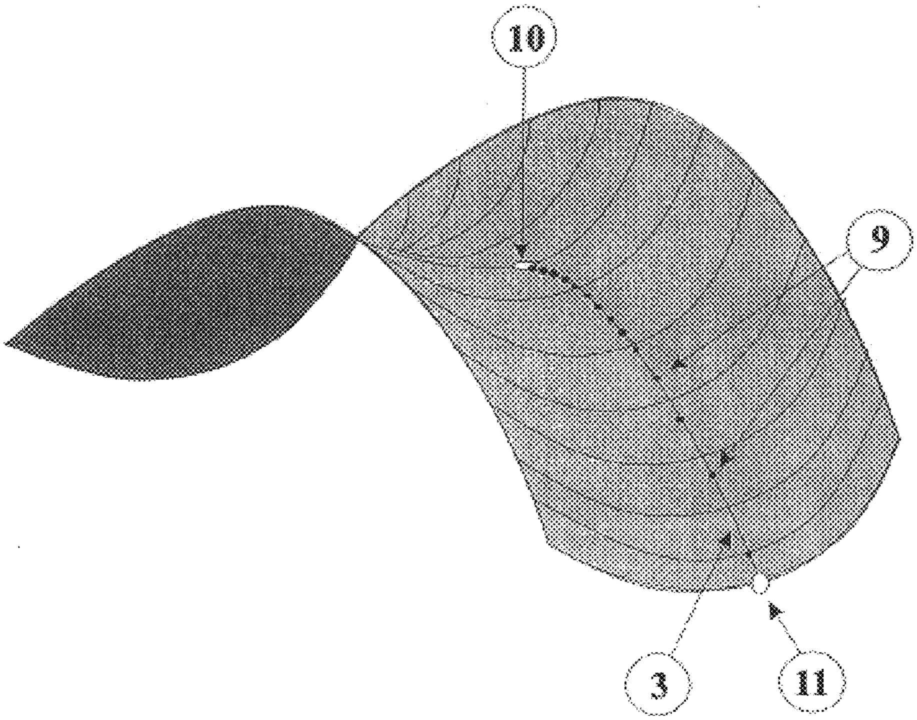
FIG. 2 depicts the potential saddle in an ion trap in a steady RF phase. The electrons are injected at point 11. The potential rising path 3 in the potential groove guides the electrons 9 to the ion cloud 10, which is stored exactly at the saddle point 10. This focusing effect is found only in y direction between the end cap electrodes. Not shown: In the r direction across the ring electrode, there is a defocusing potential, requiring a narrowly focused electron beam to reach the ion cloud in the center of the ion trap.
Figure 3:
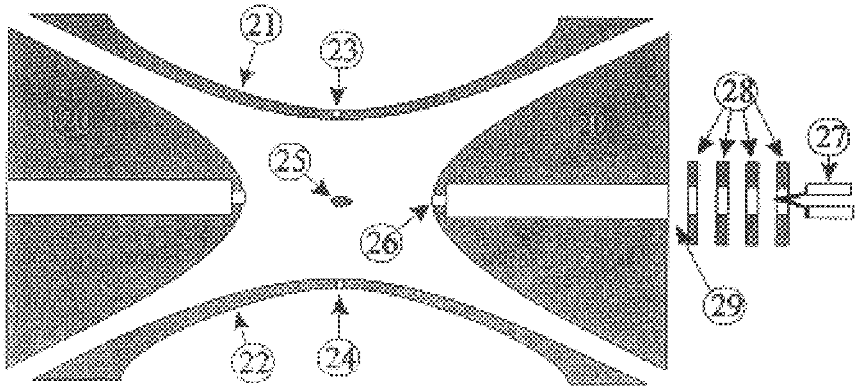
FIG. 3 depicts an ion trap with an additional electron source. The ion trap consists of a ring electrode 20 and of two end cap electrodes 21, 22, each of which has an inlet 23 and an outlet 24 hole for the ions. In the center of the ion trap there is an ion cloud 25. The ring electrode has been drilled through to create an entrance aperture for the electron beam; the electrons enter through the entrance aperture 26 into the interior of the ion trap. The electron source consists of an incandescent filament and its holder 27 and a number of lens apertures 28 which allow the strength of the electron beam to be controlled and switched on or off. Between the lens apertures and the ring electrode the potential difference changes with the period of the storage RF at the ring electrode 20. In the intermediate space 29 the potential difference induces a focusing or defocusing of the electron beam. This effect can be utilized to maintain a focussing of the electron beam through the aperture 26 only when the ring electrode is at its voltage maximum; at all other times the electron beam is defocused and only a few electrons enter the ion trap.

One of the best embodiments is shown in FIG. 3. An electrospray ion source (not shown) outside the mass spectrometer is employed for ionizing the biomolecules. It is assumed here that a mixture of digest peptides from a larger protein is to be investigated in this case. The ions are guided in the conventional way through a capillary and subsequent pressure stages with ion guides, and enter the ion trap where they are collected. An initial mass spectrum provides an overview of the digest peptides. If one or more peptides is now to be studied regarding their amino acid sequence, the trap is refilled and the doubly charged ions of these peptides are isolated by conventional means; this entails ejecting all ions from the ion trap that are not doubly charged ions of these peptides. Double-charging can be recognized from the distance between the isotopic lines, which for doubly charged ions is exactly half an atomic mass unit.

These doubly charged ions are decelerated by a short waiting period of only a few milliseconds by the ever present collision gas on their way into the center of the trap. There they form a small cloud of about 1 mm in diameter.

The ring electrode 20 of the ion trap is provided with two opposing holes of approximately 2 mm in diameter. Before one of these holes an electron emitter 27 is positioned with electrodes for electron withdrawal and electron beam focusing. This electron emitter is at a potential corresponding to that which the saddle-point of the trap potential assumes when it reaches its positive maximum.

If electron withdrawal is deactivated, an electron beam onto the entrance aperture of the ring electrode 20 is formed. The electron beam will be repelled by the ring electrode as long as the RF potential of the ring electrode is more negative than the potential of the electron emitter. If the potential of the ring electrode becomes more positive during the course of the RF cycle, the electrons become increasingly accelerated towards the ring electrode 20. They then enter the ion trap and experience a counteracting, decelerating potential profile which they can not completely scale. They are therefore reflected back at this point. Only during the maximum potential of the RF cycle can the electrons penetrate as far as the saddle-point. Upon arrival in the ion cloud 25, their kinetic energy has been reduced practically to zero. They can now be captured initially by the space charging potential of the ion cloud, and from there by the individual ions.

Since the voltage is now at its maximum amplitude, movement of ions is at its minimum due to the electrical forces imposed. This minimal movement of ions also assists the ion capture process.

During electron capture by an ion the charge status of the ion is reduced. An ionization site on the ion is neutralized, i.e., from the doubly charged ion a singly charged ion is produced. During this process ionization energy is released (or more precisely, the vast majority of ions are protonated biomolecules, so the bonding energy of the proton is released). The released energy is absorbed by the ions and leads to a very precisely defined cleavage between two amino acids. Other ions of the same type experience a cleavage between two other amino acids. Statistically, a mixture of fragment ions results which in its length reflects the entire amino acid chain, or at least a part of such a chain.

If the electron beam remains switched on for too long a time, the singly charged fragment ions start to disappear because they vanish by neutralization by further electron capture. However, this process is not very critical. As can be seen from FIG. 4, during quite an uncritical time period, the number of singly charged ions almost remains constant, only that the doubly charged ions disappear, and some of the singly charged are neutralized. In the most favorable region, the total yield of singly charged fragment ions amounts to about 50% of the doubly charged ions. If for the final daughter ion spectrum about 1000 ions are required in the trap, the ion trap should be initially filled with such a number of ions that after isolation of the wanted doubly charged ions of the peptide under investigation, about 2000 doubly charged ions remain in the trap. If there are no other losses of ions, these 2000 doubly charged ions finally give 1000 singly charged fragment ions.

The electron beam is stopped as soon as sufficient fragmentation has occurred. The fragment ions are now recorded (after a short resting period) in the conventional way as a mass spectrum. The interpretation of this mass spectrum provides the sequence, or at least a partial sequence, of the amino acids from this peptide.

This procedure can then be repeated, after refilling of the trap, for other peptides from this mixture. A very precise identification of the protein occurs as a result. One can even determine differences between those proteins measured and those catalogued in protein sequence databases.

Of course, this procedure does initially demand calibration of the most favorable ion emitter potential for each RF voltage setting. For this purpose a calibration curve is produced experimentally. Optimal values for electron current strength and duration of action of the electron beam are also determined experimentally.

The hole opposite the electron entrance aperture is designed to guide away electrons that pass beyond the potential saddle during adjustment of the electron emitter potential so that no burn-in points are produced.

Naturally, ions of the collision gas are also produced by electron collision during electron penetration. Usually, helium is employed as the collision gas, although other light gases can also be used. The mass of the ions of such gases is far below the storage threshold of the ion trap, so that these helium ions can leave the ion trap within very few RF cycles.

The procedure requires an ion trap with apertures in the ring electrode, an electron emitter with an adjustable electron emission current and an adjustable electron beam duration, and an adjustable voltage supply for the emitter potential. A simple heated cathode can serve as the emitter. Heating power can be adjusted and the beam duration is controlled using a simple Wehnelt cylinder. The electron current need not be excessively large. Since the RF voltage lies between 10 and 30 kV for a customary ion trap, the emitter potential should be adjustable between about 100 and 1000 V.

The conditions for low energy electrons to gain access to the ion cloud prevail only for the short period when the maximum of the RF voltage is achieved. This period amounts to only 1% of the oscillation cycle, i.e., approximately 10 nanoseconds. Even with a very simple electron source, electron currents of about 100 $\mu$A can be easily achieved, corresponding to approx. $6\times10^6$ electrons in 10 nanoseconds. For a good spectrum, however, only $10^3$ ions should be present in the ion cloud, since a deterioration of mass resolution otherwise occurs due to the effects of space charging.

Figure 4:
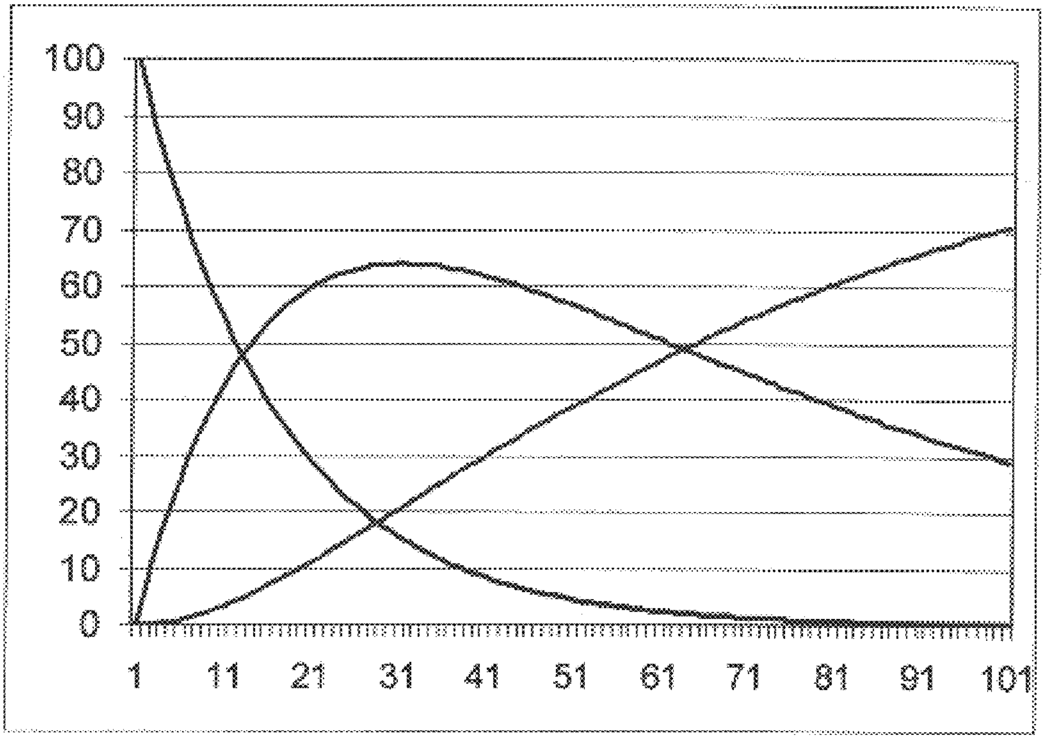
FIG. 4 shows the basic kinetics of electron capture dissociation. Doubly charged ions, starting from 100% (first curve), are transformed into singly charged fragment ions (second curve, starting from zero). These ions are slowly neutralized into neutral molecules (third curve). When the amount of residual doubly charged ions has fallen to about 4%, the singly charged ions and neutral ions amount to about 48% each.

With fragmentation by electron capture on doubly charged ions, it can not be avoided that a proportion of the already formed, singly charged fragment ions are vanishing by further electron capture. Fortunately, however, the capturing cross sections for doubly charged ions is around four times higher than that for singly charged ions, as is shown in FIG. 4. A good compromise can therefore be found between residual doubly charged parent ions, singly charged fragment ions and ions destroyed by complete discharge. It is necessary, however, to start with a considerably larger number of ions than is required for the finally recorded fragment ion spectrum. This consideration must be taken into account when calculating the number of ions which need to be fed in and isolated.

Even if one compensates for fragmentation yield losses by storing a 10-fold greater number of ions, the number of electrons even during a single RF cycle is already many times greater than the number of stored ions. However, since the supply of electrons can be kept for 1000 RF cycles or more (a millisecond or longer), it is a simple task to produce a sufficiently large supply of electrons. Even if in each RF cycle only 2 electrons are captured in the ion cloud and finally by an ion, 2000 electrons are delivered in one millisecond, enough to fragment the 2000 doubly charged ions into 1000 singly charged fragment ions.

Electron injection can also be performed (as conventionally) through the end cap electrodes. Under these conditions the ring electrode 20 must be grounded; the storage RF voltage must then be in phase at both end caps. The potential of the trap center then follows the end cap potential with an attenuation factor of about 3/5.

There are further advantages of ECD in an ion trap. The storage conditions of the ions during fragmentation can be chosen at much lower RF voltages than in the case of collisionally induced fragmentation, resulting in lower oscillation movements of the ions, favorable for electron capture, and in the storage of fragment ions with much lower masses, thus showing a fuller spectrum. In collisionally induced fragmentation, ions with lower masses than about 1/3 of the parent ion mass cannot be stored, and the RF voltage during fragmentation has to be high because otherwise there is not enough fragmentation energy collected by the collisions. As a rule, with ECD it is possible to store all peptide fragments down to the smallest amino acid masses.

The fragmentation process by ECD is fast. In a few milliseconds, fragmentation of most of the ions is finished. In contrast, fragmentation by collisionally induced dissociation (CID) takes about 30 to 80 Milliseconds.

An expert might also be able to formulate even more complicated means for supplying voltage which achieve the same effect, namely to supply the ion cloud at the center with zero-energy electrons, e.g., by the potential of the electron emitter also being at a RF voltage. All such solutions, however, are more costly than the above suggested solution to the problem, although such complicated solutions should also be embraced in the idea of the invention.

What is claimed is:

1. A method for fragmenting ions within a RF ion trap mass spectrometer, the mass spectrometer comprising a ring electrode and two end cap electrodes and being operated by a RF voltage at the ring electrode or at both of the end cap electrodes, wherein fragmentation of the ions is induced by the capture of low energy electrons, the electrons are injected into the ion trap through an aperture in one of the electrodes charged with RF voltage, and the electrons are produced at an electric DC potential which, with minor deviations, is equal to the highest positive potential that occurs at the center of the ion trap during a cycle of the RF voltage.

2. A method according to claim 1 wherein the electron beam is influenced by the potential of the electrode carrying the RF voltage in such a way that it is focused into the ion trap only when the potential reaches its maximum.

3. An ion trap mass spectrometer for performing a method according to claim 1 wherein the RF voltage is applied to the ring electrode, the ring electrode possesses at least one aperture for injecting electrons, an electron source is located outside one of these openings, and a voltage supply keeps the electron source at a DC potential which can be adjusted between +100 and +1000 V.

4. An ion trap mass spectrometer for performing a method according to claim 1 wherein both of the end cap electrodes are charged in-phase with the RF voltage, one of the end cap electrodes has an opening for injecting electrons, an electron source is located outside this opening, and a voltage supply keeps the electron source at a DC potential which can be adjusted between +100 and +1000 V.

5. An ion trap mass spectrometer according to claim 3 wherein the electron beam current and the duration of the electron beam produced by the electron source can be controlled.

6. An ion trap mass spectrometer according to claim 4 wherein the electron beam current and the duration of the electron beam produced by the electron source can be controlled.

7. An ion trap mass spectrometer according to claim 3 wherein the electron beam from the electron source is only focussed into the ion trap when the maximum potential is reached.

8. An ion trap mass spectrometer according to claim 4 wherein the electron beam from the electron source is only focussed into the ion trap when the maximum potential is reached.

9. An ion trap mass spectrometer comprising:

a ring electrode;

two end cap electrodes arranged relative to the ring electrode such that the application of an RF voltage to the ring electrode or end cap electrodes can be used to establish a primarily quadrupole field within the ion trap that causes the formation of an ion cloud at a center of the trap; and an electron source that injects electrons into the ion trap toward the ion cloud, the electrons having a trajectory and energy level that result in their capture in the electron cloud, leading subsequently to fragmentation of ions in the cloud, wherein the electrons are produced at an electric DC potential which is approximately equal to the highest positive potential that occurs at the center of the ion trap during a cycle of the RF voltage.

10. An ion trap mass spectrometer comprising:

a ring electrode;

two end cap electrodes arranged relative to the ring electrode such that the application of an RF voltage to the ring electrode or end cap electrodes can be used to establish a primarily quadrupole field within the ion trap that causes the formation of an ion cloud at a center of the trap; and an electron source that injects electrons into the ion trap toward the ion cloud, the electrons having a trajectory and energy level that result in their capture in the electron cloud, leading subsequently to fragmentation of ions in the cloud, wherein the injection of the electrons is such that they are focused into the ion trap only when the electrical potential of the electrode carrying the RF voltage reaches its maximum.

11. An ion trap mass spectrometer comprising:

a ring electrode;

two end cap electrodes arranged relative to the ring electrode such that the application of an RF voltage to the ring electrode can be used to establish a primarily quadrupole field within the ion trap that causes the formation of an ion cloud at a center of the trap; and an electron source that injects electrons into the ion trap toward the ion cloud, the electrons having a trajectory and energy level that result in their capture in the electron cloud, leading subsequently to fragmentation of ions in the cloud, wherein the electrons are injected through an aperture in the ring electrode.

12. A method for fragmenting ions within a RF ion trap mass spectrometer comprising a ring electrode and two end cap electrodes and being operated by a RF voltage at the ring electrode or at both of the end cap electrodes, the method comprising:

collecting an ion cloud at the center of the ion trap; and injecting electrons into the ion trap through an aperture in one of the electrodes charged with RF voltage, the electrons having a trajectory and energy level that result in their capture in the electron cloud, leading subsequently to fragmentation of ions in the cloud, wherein the electrons are produced at an electric DC potential which is approximately equal to the highest positive potential that occurs at the center of the ion trap during a cycle of the RF voltage.

13. A method for fragmenting ions within a RF ion trap mass spectrometer comprising a ring electrode and two end cap electrodes and being operated by a RF voltage at the ring electrode or at both of the end cap electrodes, the method comprising:

collecting an ion cloud at the center of the ion trap; and injecting electrons into the ion trap through an aperture in one of the electrodes charged with RF voltage, the electrons having a trajectory and energy level that result in their capture in the electron cloud, leading subsequently to fragmentation of ions in the cloud, wherein the injection of the electrons is such that they are focused into the ion trap only when the electrical potential of the electrode carrying the RF voltage reaches its maximum.

14. A method for fragmenting ions within a RF ion trap mass spectrometer comprising a ring electrode and two end cap electrodes and being operated by a RF voltage at the ring electrode, the method comprising:

collecting an ion cloud at the center of the ion trap; and injecting electrons into the ion trap through an aperture in one of the electrodes charged with RF voltage, the electrons having a trajectory and energy level that result in their capture in the electron cloud, leading subsequently to fragmentation of ions in the cloud, wherein the electrons are injected through an aperture in the ring electrode.

* * * * *